United States Patent
Suzuki et al.

(10) Patent No.: US 10,563,728 B2
(45) Date of Patent: Feb. 18, 2020

(54) GEAR TRANSMISSION APPARATUS

(71) Applicant: KABUSHIKI KAISHA TOYOTA CHUO KENKYUSHO, Nagakute-shi, Aichi-ken (JP)

(72) Inventors: Atsushi Suzuki, Nagakute (JP); Gentaro Yamanaka, Nagakute (JP); Yasumitsu Osada, Nagakute (JP); Masaru Sugai, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/195,140

(22) Filed: Nov. 19, 2018

(65) Prior Publication Data
US 2019/0285140 A1    Sep. 19, 2019

(30) Foreign Application Priority Data

Mar. 19, 2018   (JP) ................................ 2018-050752

(51) Int. Cl.
| | | |
|---|---|---|
| F16H 37/06 | (2006.01) | |
| F16H 1/20 | (2006.01) | |
| F16H 35/06 | (2006.01) | |
| F16H 57/038 | (2012.01) | |
| F16H 57/039 | (2012.01) | |
| F16H 57/025 | (2012.01) | |

(52) U.S. Cl.
CPC ............. *F16H 1/203* (2013.01); *F16H 35/06* (2013.01); *F16H 57/025* (2013.01); *F16H 57/038* (2013.01); *F16H 57/039* (2013.01)

(58) Field of Classification Search
CPC ........ F16H 1/203; F16H 35/06; F16H 57/038; B25J 17/0258
See application file for complete search history.

(56) References Cited

U.S. PATENT DOCUMENTS

| | | | | |
|---|---|---|---|---|
| 4,662,815 | A * | 5/1987 | Zimmer ............... | B25J 17/0291 414/735 |
| 2014/0213409 | A1* | 7/2014 | Yoon ....................... | F16H 1/203 475/343 |
| 2015/0340926 | A1* | 11/2015 | Searfoss ................ | H02K 7/116 310/83 |

FOREIGN PATENT DOCUMENTS

JP    H03-79582 B2    12/1991

\* cited by examiner

*Primary Examiner* — Jake Cook
(74) *Attorney, Agent, or Firm* — Oliff PLC

(57) ABSTRACT

A first gear pair includes a first pinion on an input shaft and a first ring gear on an intermediate shaft. A second gear pair includes a second pinion on the intermediate shaft and a second ring gear on an output shaft. A first case that stores the first gear pair is coupled to a base member in a rotatable manner around an input shaft rotational axis. A second case is coupled to the first case in a rotatable manner around an intermediate shaft rotational axis.

4 Claims, 3 Drawing Sheets

GEAR TRANSMISSION APPARATUS

CROSS REFERENCE TO RELATED APPLICATION

The disclosure of Japanese Patent Application No. 2018-050752 filed on Mar. 19, 2018, including the specification, claims, drawings, and abstract, is incorporated herein by reference in its entirety.

TECHNICAL FIELD

The present disclosure relates to a gear transmission apparatus, and in particular to a gear transmission apparatus that can change a direction of an output shaft with respect to an input shaft by changing a positional relationship between gears which engage each other.

BACKGROUND

JP H3-79582 B discloses a gear transmission apparatus (A) which can change a direction of an output shaft (15) with respect to an input shaft (1). A bevel gear (4) is coupled to the input shaft (1), and engages an idler bevel gear (7) on an intermediate shaft (8), and the idler bevel gear (7) further engages an output-side bevel gear (10) coupled to the output shaft (15). The input shaft (1) is supported on an input-side casing (6) via a bearing, and an intermediate shaft cover (20) is fixed on the input-side casing (6). In addition, the output shaft (15) is supported on an output-side casing (17) via a bearing, and an intermediate shaft cover (22) is fixed on the output-side casing (17). The two intermediate shaft covers (20, 22) have thrust rings (21, 23) on respective surfaces that oppose each other. The thrust ring (21, 23) can slide in a circumferential direction, and, with this motion, the two intermediate shaft covers (20, 22) are relatively rotatable around an axis of the intermediate shaft (8). With the rotation of the intermediate shaft covers (20, 22), the output shaft (15) can rotate with respect to the input shaft (1) in a plane orthogonal to the axis of the intermediate shaft (8). In the above description, reference numerals and signs in the parentheses are those used in JP H3-79582 A, and do not correspond to the reference numerals or signs used in the description of the embodiment of the present disclosure.

In the gear transmission apparatus described in JP H3-79582 A, the output shaft is rotatable only in one plane with respect to the input shaft, and a degree of freedom of rotation as a joint is 1. An advantage of the present disclosure lies in provision of a gear transmission apparatus having 2 degrees of freedom of rotation as a joint.

SUMMARY

According to one aspect of the present disclosure, there is provided a gear transmission apparatus comprising: a first gear pair including a first gear which is coupled to an input shaft and a second gear which engages the first gear; and a second gear pair including a third gear which integrally rotates with the second gear and a fourth gear which engages the third gear and which is coupled to the output shaft. A first axis which is a rotational axis of the first gear and a second axis which is a rotational axis of the second gear are arranged in a crossing manner or in a skewed manner. A third axis which is a rotational axis of the third gear and a fourth axis which is a rotational axis of the fourth gear are arranged in a crossing manner or in a skewed manner. The gear transmission apparatus further comprises: a first gear case that stores the first gear pair and that is coupled to a base member in a rotatable manner around the first axis; and a second gear case that stores the second gear pair and that is coupled to the first gear case in a rotatable manner around the second axis.

Because the first gear case is rotatable with respect to the base member and the second gear case is rotatable with respect to the first gear case, the number of degrees of freedom of rotation of the output shaft is 2.

According to another aspect of the present disclosure, the first gear pair and the second gear pair may be configured as reduction gear pairs.

According to another aspect of the present disclosure, the first gear pair and the second gear pair may be contrate gears.

ADVANTAGEOUS EFFECTS OF INVENTION

According to the gear transmission apparatus of the present disclosure, a number of degrees of freedom of rotation of the output shaft with respect to the input shaft may be set to 2.

BRIEF DESCRIPTION OF DRAWINGS

Embodiment(s) of the present disclosure will be described by reference to the following figures, wherein.

DESCRIPTION OF EMBODIMENTS

Figure 1:
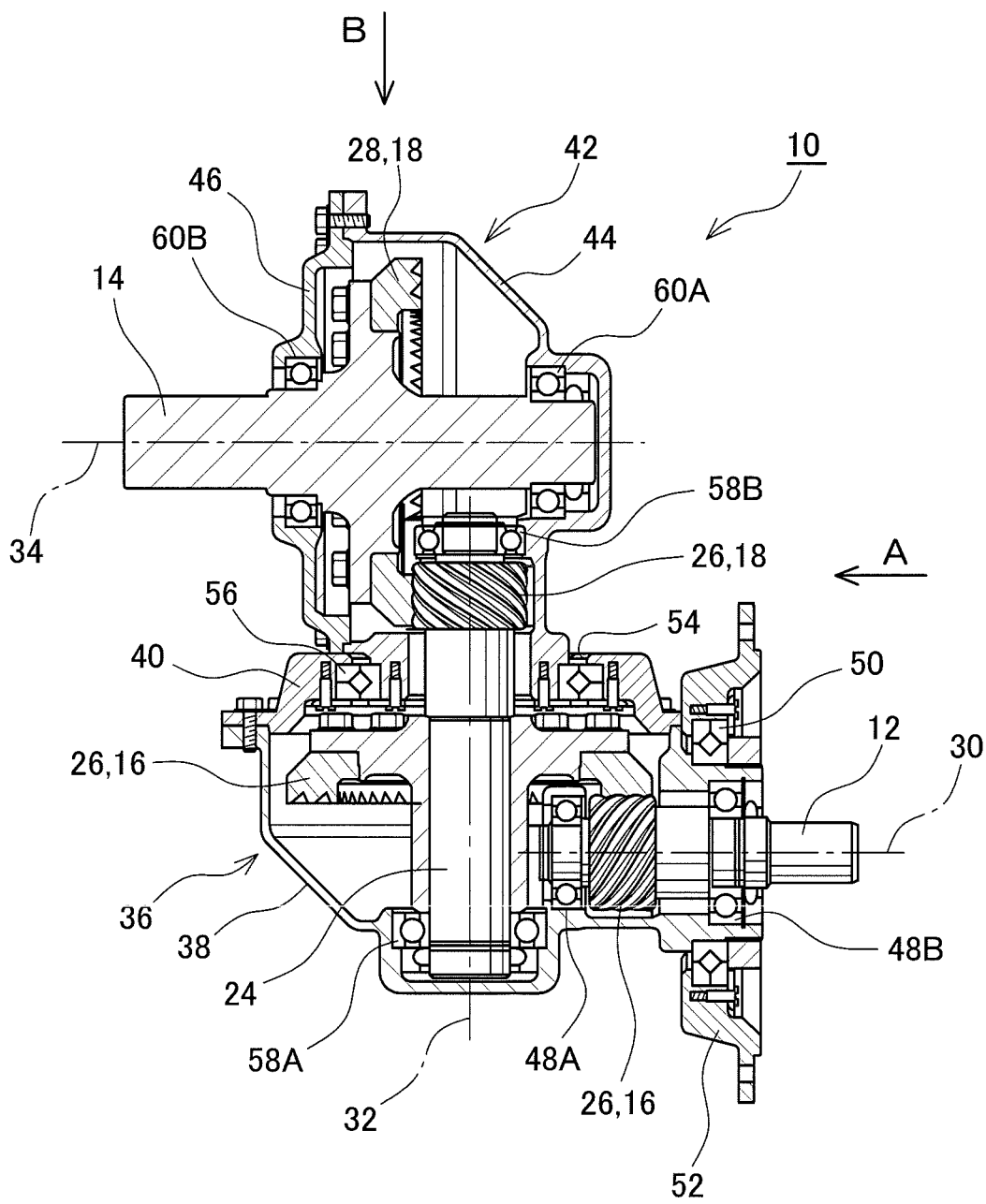
FIG. 1 is a cross-sectional diagram schematically showing a structure of a gear transmission apparatus according to an embodiment of the present disclosure.

An embodiment of the present disclosure will now be described with reference to the drawings. FIG. 1 is a cross-sectional diagram showing a gear transmission apparatus 10 according to an embodiment of the present disclosure. The gear transmission apparatus 10 is an apparatus which transmits motive power between an input shaft 12 and an output shaft 14, and the motive power is transmitted via two gear pairs 16 and 18. The first gear pair 16 includes a first pinion 20 which is provided on the input shaft 12 and which integrally rotates with the input shaft 12, and a first ring gear 22 which engages the first pinion 20. The first ring gear 22 is fixed on an intermediate shaft 24, and integrally rotates with the intermediate shaft 24. The second gear pair 18 includes a second pinion 26 which is provided on the intermediate shaft 24 and which integrally rotates with the intermediate shaft 24, and a second ring gear 28 which engages the second pinion 26. The second ring gear 28 is fixed on the output shaft 14, and integrally rotates with the output shaft 14.

An input shaft rotational axis 30 which is a center of rotation of the input shaft 12 and an intermediate shaft rotational axis 32 which is a center of rotation of the intermediate shaft 24 are arranged in an orthogonal manner. In addition, the intermediate shaft rotational axis 32 and an output shaft rotational axis 34 which is a center of rotation of the output shaft 14 are arranged in an orthogonal manner.

The first gear pair 16 is a contrate gear including the first pinion 20 which is a helical gear, and the first ring gear 22 of a crown gear which is a bevel gear having a flat pitch surface. Similarly, the second gear pair 18 is a contrate gear including the second pinion 26 which is a helical gear, and the second ring gear 28 which is a crown gear. Alternatively, the first and second gear pairs 16 and 18 may be formed by bevel gears.

The first gear pair 16 is a reduction gear pair, and a rotational speed of the first ring gear 22 is lower than a rotational speed of the first pinion 20. Similarly, the second gear pair 18 is a reduction gear pair, and a rotational speed of the second ring gear 28 is lower than a rotational speed of the second pinion 26.

The first gear pair 16 is stored in a first case 36. The first case 36 has a first case body 38 and a first case cover 40, which are integrated by a fastening element such as a bolt. The second gear pair 18 is stored in a second case 42. The second case 42 has a second case body 44 and a second case cover 46, which are integrated by a fastening element such as a bolt.

The first case body 38 supports the input shaft 12 via two input shaft bearings 48A and 48B placed sandwiching the first pinion 20. The first case body 38 is also supported on a base member 52 via a first case bearing 50. The base member 52 is fixed on another device, and supports the gear transmission apparatus 10 with respect to this device. When the input shaft 12 is coupled to a rotor of a motor which is a motive power source, the base member 52 can be fixed on a case of the motor. A central axis of the first case bearing 50 coincides with the input shaft rotational axis 30, and, with this configuration, the first case 36 is coupled to the base member 52 in a rotatable manner around the input shaft rotational axis 30.

A first case cover opening 54 through which the intermediate shaft 24 passes is formed on the first case cover 40, and a second case bearing 56 is fixed to an inner circumference of the first case cover opening 54. The second case body 44 is supported on the first case cover 40 via the second case bearing 56. A central axis of the second case bearing 56 coincides with the intermediate shaft rotational axis 32, and, with this configuration, the second case 42 is coupled to the first case 36 in a rotatable manner around the intermediate shaft rotational axis 32.

The intermediate shaft 24 is supported on the first case body 38 and the second case body 44 via intermediate shaft bearings 58A and 58B. In addition, the output shaft 14 is supported on the second case body 44 and the second case cover 46 via output shaft bearings 60A and 60B.

In a state shown in FIG. 1, the input shaft 12 and the output shaft 13 are arranged parallel to each other. When the first case 36 is rotated with respect to the base member 52 around the input shaft rotational axis 30 in this state, the output shaft 14 moves around the input shaft rotational axis 30 while the parallel state with the input shaft 12 is maintained. An angle of rotation of the first case 36 will hereinafter be described as a phase angle θ.

Figure 2:
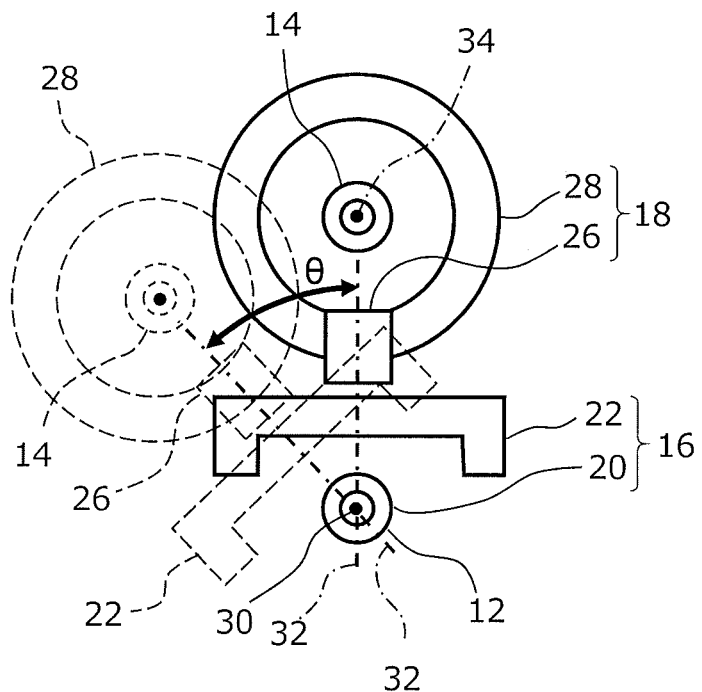
FIG. 2 is a view along an arrow A of FIG. 1, and is an explanatory diagram of a rotational operation around a rotational axis of an input shaft.

FIG. 2 is a diagram schematically showing relevant portions of the gear transmission apparatus 10 in a state viewed in a direction of an arrow A shown in FIG. 1, and shows a relationship between the first gear pair 16 and the second gear pair 18 when the phase angle θ is changed. When the first case 36 is rotated by the phase angle θ around the input shaft rotational axis 30 from a state shown by a solid line, the first ring gear 22, the second pinion 26, the second ring gear 28, and the output shaft 14 are rotated to positions shown by broken lines.

Alternatively, when the second case 42 is rotated with respect to the first case 36 around the intermediate axis rotational axis 32 from the state shown in FIG. 1, the input shaft 12 and the output shaft 14 become not parallel to each other. However, the input shaft 12 and the output shaft 14 do not cross. The relationship between the input shaft 12 and the output shaft 14 is defined by orthogonally projecting a central line of the input shaft 12 (input shaft rotational axis 30) and a central line of the output shaft 14 (output shaft rotational axis 34) onto a plane orthogonal to a common normal of the central lines, and defining a crossing angle (shaft angle Σ) of the projected central lines. The shaft angle Σ is 0° when the input shaft 12 and the output shaft 14 are parallel to each other.

Figure 3:
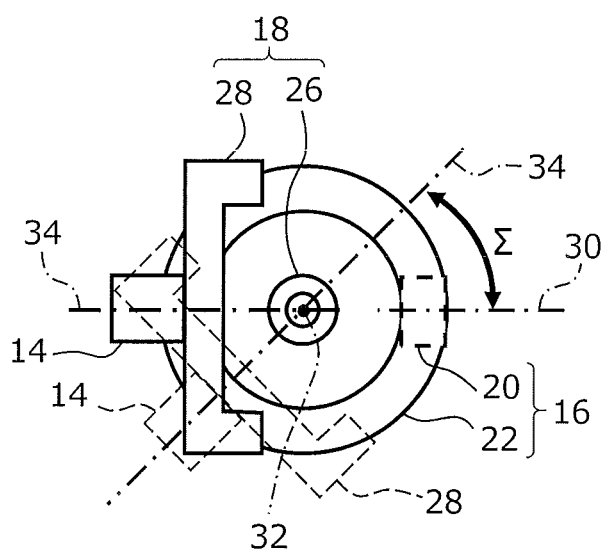
FIG. 3 is a view along an arrow B of FIG. 1, and is an explanatory diagram of a rotational operation around a rotational axis of an intermediate shaft.

FIG. 3 is a diagram schematically showing relevant portions of the gear transmission apparatus 10, in a state viewed in a direction of an arrow B shown in FIG. 1, and shows a relationship between the first gear pair 16 and the second gear pair 18 when the shaft angle Σ is changed. When the second case 42 is rotated by the shaft angle Σ around the intermediate shaft rotational axis 32 from a state shown by a solid line, the second ring gear 28 and the output shaft 14 are rotated to positions shown by broken lines.

When the first case 36 is rotated in a state where the shaft angle with respect to the input shaft 12 is given to the output shaft 14 by rotating the second case 42, a direction of the output shaft 14 can be changed. By suitably selecting the phase angle and the shaft angle, the direction of the output shaft 14 with respect to the input shaft 12 can be set to a desired direction. In other words, with regard to the direction of the output shaft 14, two degrees of freedom can be realized.

The gear transmission apparatus 10 functions as a joint in which the direction of the output shaft 14 with respect to the input shaft 12 can be changed, and, at the same time, functions as a gear reducer because the first gear pair 16 and the second gear pair 18 form reduction gear pairs.

In order to control the rotational angle of the first case 36 (phase angle θ), an actuator may be provided. For example, a spur gear or a helical gear is provided on the first case 36 with the input shaft rotational axis 30 being the central line thereof, and the first case 36 is rotated by a motor or the like via a pinion which engages this gear. In order to control the rotational angle of the second case 42 (shaft angle Σ), an actuator may be provided. For example, a spur gear or a helical gear is provided on the second case 42 with the intermediate shaft rotational axis 32 being the central line thereof, and the second case 42 is rotated by a motor or the like via a pinion which engages this gear.

The first gear pair 16 and the second gear pair 18 are gear pairs in which the rotational axes of two engaging gears cross each other, but alternatively, the rotational axes may be arranged in a skewed manner, or the gear pair may be a hypoid gear which is arranged in a skewed manner.

Figure 4:
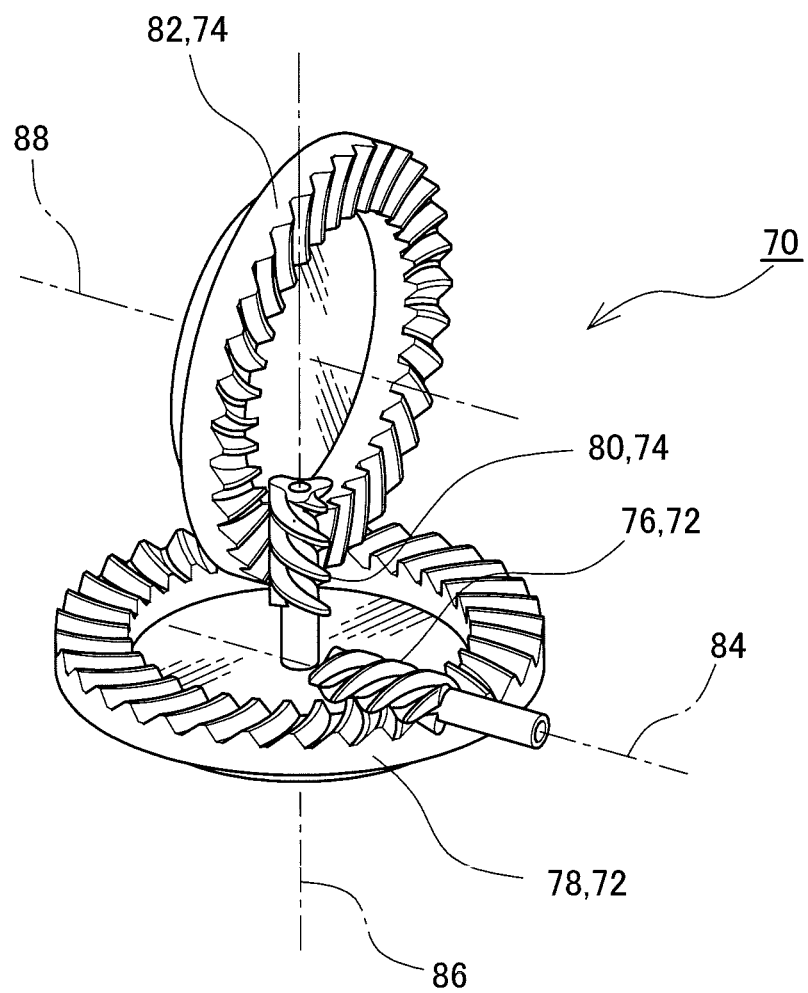
FIG. 4 is a schematic diagram showing a structure of relevant portions of a gear transmission apparatus which uses a skew gear pair.

FIG. 4 is a diagram schematically showing relevant portions of a gear transmission apparatus 70 which uses a gear pair of a skewed arrangement. The gear transmission apparatus 70 comprises a first gear pair 72 and a second gear pair 74 which are contrate gears. Cases which store the first and second gear pairs 72 and 74, bearings supporting the gears, and mechanisms for relatively rotating the cases may be formed similarly as those in the gear transmission apparatus 10 described above, and will not be repeatedly shown or described.

The first gear pair 72 has a first pinion 76 and a first ring gear 78 which engage each other, and the second gear pair 74 has a second pinion 80 and a second ring gear 82 which engage each other. The first pinion 76 rotates around an input shaft rotational axis 84, and the first ring gear 78 and the second pinion 80 integrally rotate around an intermediate shaft rotational axis 86. The second ring gear 82 rotates around an output shaft rotational axis 88. The input shaft rotational axis 84 and the intermediate shaft rotational axis 86 do not cross each other and are in a skewed arrangement, and the intermediate shaft rotational axis 86 and the output shaft rotational axis 88 also do not cross each other and are in a skewed arrangement. The first ring gear 78, the second pinion 80, and the second ring gear 82 can rotated around the input shaft rotational axis 84, and the second ring gear 82 can rotate around the intermediate shaft rotational axis 86. With this configuration, similar to the gear transmission apparatus 10, the gear transmission apparatus 70 is provided with two degrees of freedom with regard to the direction of the output shaft with respect to the input shaft.

The invention claimed is:

1. A gear transmission apparatus comprising:
    a first gear pair including (i) a first gear having a first rotational axis and coupled to an input shaft, and (ii) a second gear having a second rotational axis and engaged to the first gear, the first axis and the second axis intersecting or being askew with respect to each other;
    a second gear pair including (i) a third gear having a third axis and configured to integrally rotate with the second gear, and (ii) a fourth gear having a fourth rotational axis and engaged to the third gear, the fourth gear being coupled to an output shaft, the third axis and the fourth axis intersecting or being askew with respect to each other, and the second axis maintaining an orthogonal relationship to the first and fourth axes;
    a first gear case housing the first gear pair and rotatably coupled to a base member along the first axis; and
    a second gear case housing the second gear pair and rotatably coupled to the first gear case along the second axis.

2. The gear transmission apparatus according to claim 1, wherein the first gear pair and the second gear pair are reduction gear pairs.

3. The gear transmission apparatus according to claim 1, wherein the first gear pair and the second gear pair are contrate gears.

4. The gear transmission apparatus according to claim 1, wherein:
    the first gear and the third gear are helical gears, and
    the second gear and fourth gear are crown gears.

* * * * *